June 21, 1960

P. F. SOUTHWICK 2,941,405

MUD SAMPLER AND PRESSURE INDICATOR

Filed April 10, 1956

INVENTOR
PETER F. SOUTHWICK,

BY

ATTORNEY

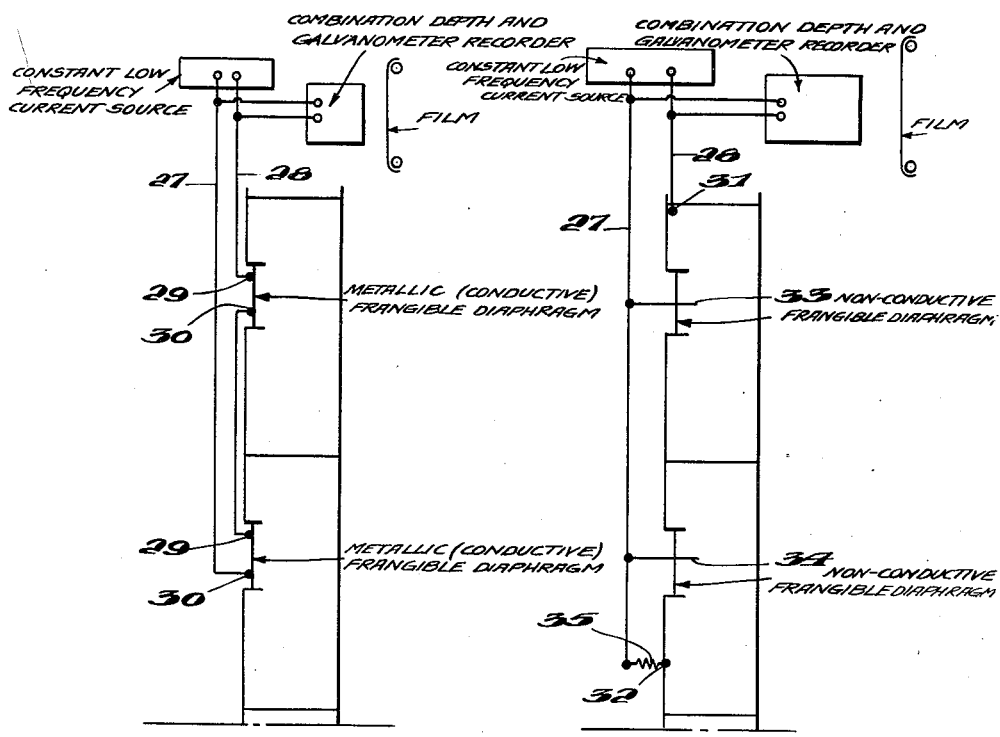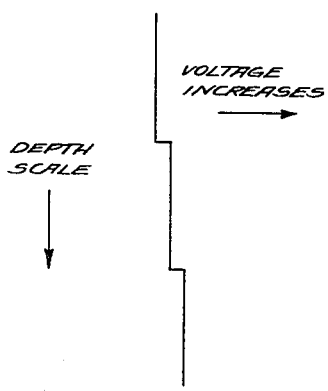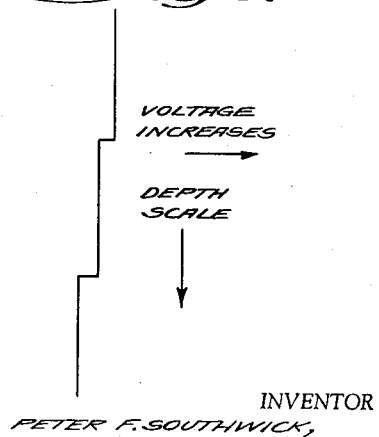

United States Patent Office 2,941,405
Patented June 21, 1960

2,941,405

MUD SAMPLER AND PRESSURE INDICATOR

Peter F. Southwick, Indiana Township, Allegheny County, Pa., assignor to Gulf Research & Development Company, Pittsburgh, Pa., a corporation of Delaware Filed Apr. 10, 1956, Ser. No. 577,299

6 Claims. (Cl. 73—421)

This invention relates to a sampling and indicating apparatus for wells. More particularly, the invention pertains to an apparatus for simultaneously sampling fluid in a borehole and determining the pressure and depth of the well at the point at which the sample is taken.

In connection with the electric logging of wells, it is desirable to take for analysis samples of the drilling mud in order to correct the log for the resistivity of the mud itself. Since during the logging of a well the drilling mud is not circulated, the mud resistivity will vary with depth because of the incursion of formation waters, settling of solids from the mud and the like. It is therefore advantageous, in taking for resistivity measurements mud samples at various depths, to have a record of the depth at which the mud sample is taken.

In accordance with my invention, I provide a device for obtaining drilling mud samples within a well, the device having a sample chamber and a normally closed inlet to the chamber, pressure responsive means for opening the inlet and means to indicate at the surface of the well the occurrence of opening of the inlet and the depth at which said opening occurs.

More particularly stated, the invention provides a structure adapted to be attached to the end of a logging device and lowered into a well. The structure forms a cylindrical container having a pressure responsive valve which, upon opening at a predetermined pressure, permits the container to become filled with mud, after which a suitable valve arrangement closes the opening in the container. Furthermore, upon opening of the pressure responsive valve, there is provided at the surface, a record of the depth of the well at the time of opening of the valve.

My invention may be better understood by reference to the drawings accompanying this application and forming a part thereof. In the drawings, Figure 1 is a vertical sectional view of a specific embodiment of the apparatus showing the device ready to receive a sample;

Figure 3 is a view in elevation showing a series of the well sampling devices with the electrical circuit connected in series;

Figure 4 shows diagrammatically a portion of the depth record produced by the apparatus of this invention employing a series electrical circuit;

Figure 5 is a view in elevation showing a series of the well sampling devices with the electrical circuit connected in parallel;

Figure 6 shows diagrammatically a portion of the depth record produced by the apparatus of this invention employing a parallel electrical circuit.

Figure 1:
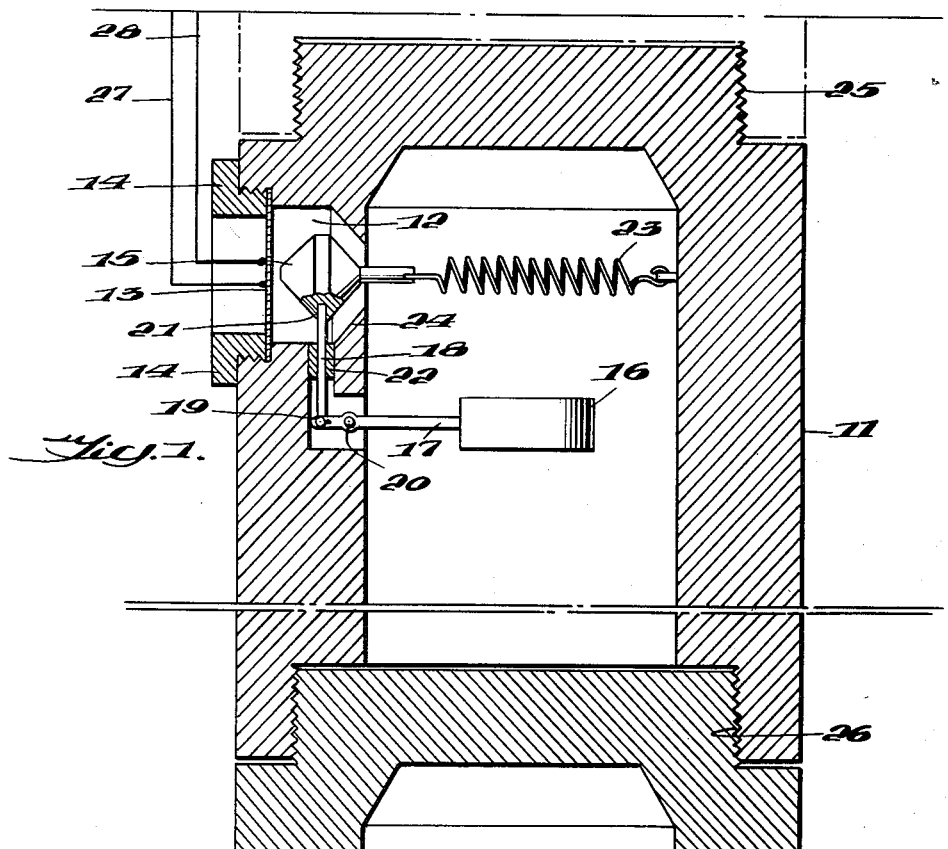

Referring now more particularly to Figure 1 of the drawing, numeral 11 designates a container in the form of a cylinder whose diameter is approximately the same as that of conventional logging devices. The container is provided with a channel 12 for communication between the interior of the chamber and the well bore. This channel or inlet should preferably be adjacent the top of the container. A pressure-sensitive or pressure-responsive valve 13 is provided to permit flow of fluid from the well bore through the channel 12 into the interior of the container. The pressure-sensitive valve is so constructed that it opens when the difference in pressure between the exterior and interior of the container exceeds a predetermined value and remains open thereafter. While any suitable known pressure-responsive valve can be employed, a particularly simple and convenient valve is provided by a rupturable or frangible metal diaphragm 13. Such diaphragms can be constructed to rupture at varying predetermined pressures. The frangible diaphragm is held in position normally closing channel 12, by any suitable means such as lock nut 14, threaded into a recess forming a continuation of channel 12. This arrangement permits the diaphragm to be easily replaced.

Figure 2:
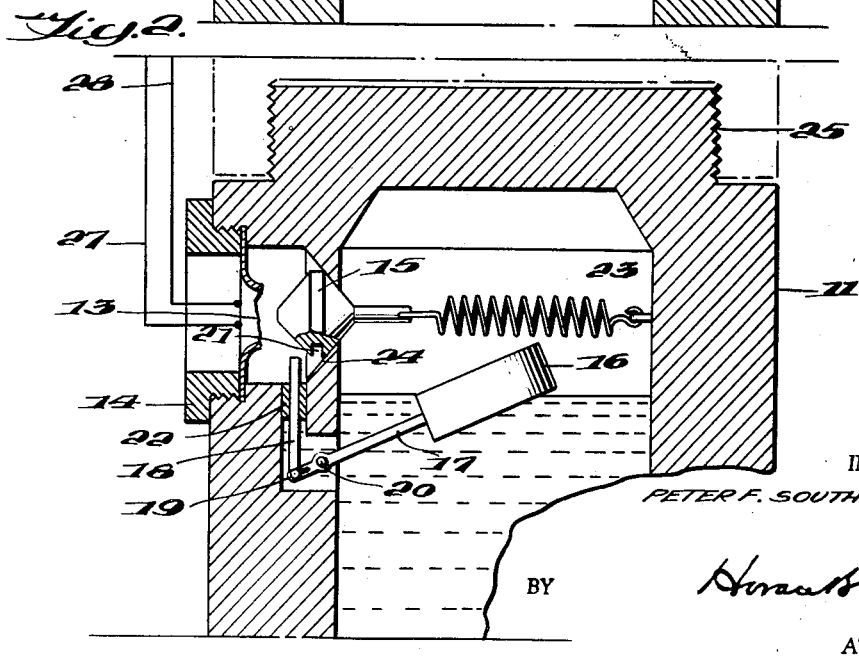
Figure 2 is a vertical sectional view of the apparatus of Figure 1 showing the device after the sample has been taken.

The container 11 is also provided with a liquid-level controlled valve that closes when the liquid level inside the container reaches a predetermined height. This valve may be of any suitable design which will enable it to close channel 12 and thus entrap the sample within the container. A simple effective closing means is the spring-loaded, float-controlled valve 15, illustrated in Figures 1 and 2 of the drawings. The lever arm 17 of the float 16 is attached to a steel pin 18 by a loose pin 19, the entire assembly pivoting about pin 20. The pin 18 engages recess 21 in valve 15 to hold this valve open as when there is no mud sample in the container. packing 22 is provided to surround steel pin 18 so that the only orifice is the one controlled by the valve 15. As shown in Figure 2, when the mud sample has sufficiently filled the container, the action of float 16 disengages pin 18 from the recess 21, permitting valve 15 to be seated and closed against seat 24 by means of spring 23.

In order to record the exact depth of the well at which the sample enters the container the frangible-diaphragm valve 13 is made part of an electrical circuit. When the diaphragm ruptures as a mud sample is taken, a change occurs in the resistance of the circuit. The change in resistance of the circuit can be readily detected and a mark can then be placed on the depth record either manually or automatically by suitable instrumentation. In this manner a record is obtained of the exact depth of the borehole at which the sample enters the container. By correlating this depth determination with the predetermined pressure which the diaphragm was capable of withstanding, a record of the pressure existing in the well at this particular point is obtained. The record would be made on a strip of photographic film using a galvanometer and a beam of light in a manner similar to the conventional logging methods.

The top of cylindrical container 11 is provided with a threaded neck 25 to provide for attachment of the apparatus of the invention to the end of a drill pipe or any logging device. The bottom of container 11 can be provided with a threaded recess 26 of suitable diameter to receive the threaded neck portion of a second similar container. This construction permits of simple attachment of the sampling device of the invention for lowering within the well bore. It also permits the use of a multiplicity of the sampling devices whereby each device is actuated at a different pressure, thus permitting sampling from several depths in the borehole in one operation. A suitable arrangement of a series of such devices is shown in Figure 3 and Figure 5.

As will be seen from Figure 3, each sampling device is electrically connected in series with the surface indicating means to enable depth recording to be made at the moment each sampling device opens. A combination depth and galvanometer recorder can be used for this purpose. In this arrangement insulated wires 27 and 28 which lead from a constant low frequency current source at the surface are attached to the conductive metal diaphragms as at terminals 29 and 30. When the diaphragms are broken the only electrical path is through the drilling fluid which is between the terminals. The electrical path through the drilling fluid is one of much higher resistance than the direct path through the metallic diaphragm. Therefore, each diaphragm that ruptures can be considered as a series resistor in the overall series circuit. In a series circuit the total resistance is the sum of all of the individual resistances, i.e., $R_t = R_1 + R_2 + R_3 \ldots$ Now, using Ohm's law $E = IR$ where E the dependent variable, is the potential difference in volts across the entire series circuit, I is the constant current furnished to the circuit in amperes and R, the independent variable in this case, is the total resistance in the series circuit in ohms, it is apparent that each time a diaphragm ruptures, the voltage across the circuit will increase due to the increase in resistance and the voltage will continue to increase in direct proportion to each increase in resistance.

Figure 5 shows an arrangement of a series of the sampling devices in which each sampling device is electrically connected in parallel with the surface indicating means. In this arrangement insulated wire 28 is attached to the body of the top container as at terminal 31. Insulated wire 27 is attached to the body of the bottom container as at terminal 32 to include the entire series of containers in one electrical circuit. Non-conductive frangible diaphragms are employed with extensions of insulated wire 27 attached to each diaphragm in such manner that a bare wire or plug extends within the sample chamber of each container as at 33, 34. The resistance of this circuit including resistor 35 is at a maximum before the non-conducting diaphragms are broken. Each time a non-conducting diaphragm ruptures, thus exposing the bare wire or plugs to the drilling fluid, a parallel path is added for current flow through the drilling fluid. The resistance of this added path through the drilling fluid is added in parallel to the existing resistor 35. Each parallel parth that is added for current flow reduces the overall resistance across the circuit as indicated by the equation $$R_t = \frac{1}{\frac{1}{R_1} + \frac{1}{R_2} + \frac{1}{R_3}}$$

Applying Ohm's law, the voltage E across the circuit will decrease each time a diaphragm is broken because the resistance R decreases also while the current I remains constant.

In operation, the sampling device is lowered into a well with the frangible diaphragm 13 preventing the entry of drilling mud and the valve 15 is held open, all as shown in Figure 1. When the device reaches a depth at which the hydrostatic head of fluid in the well bore exceeds the pressure necessary to rupture the diaphragm, the diaphragm is ruptured and this fact is indicated at the surface by the corresponding change in resistance of the electrical circuit. A record is made of the depth and the device is permitted to fill with drilling mud at this depth until the valve 15 is closed by operation of the float and pin assembly, as shown in Figure 2. The device can then be withdrawn for analysis of the entrapped drilling mud sample.

It is apparent from the foregoing description of the invention that the invention discloses a device of novel construction for sampling wells. Of outstanding importance and advantage is the fact that this device not only obtains a sample of drilling mud at various depths but also gives the depth of the well and the pressure existing therein at the point where the sample is obtained. These determinations are obtained simultaneously thereby eliminating errors which often occur in conventional sampling techniques. Furthermore, samples may be obtained at various depths in the well in one operation with a saving in time and effort.

Although my invention has been described with reference to certain particular embodiments thereof which I have found suitable, it will be recognized that the apparatus may be modified in its details of construction without departing from the spirit of the invention, and I do not intend that the scope of my invention shall be limited to the structural details of apparatus herein shown, except as defined in the appended claims.

Having described my invention, what I claim is:

1. A device for obtaining drilling mud samples within a well bore comprising a container having a sample chamber, an inlet to said chamber communicating with the well bore, means normally closing said inlet comprising a frangible metal diaphragm adapted to be ruptured by a predetermined hydrostatic pressure of the fluid within said well bore, said diaphragm being part of an electrical circuit including means at the surface of the well to indicate rupture of said diaphragm, and means at the surface of the well to indicate the depth at which said rupture occurs.

2. A device in accordance with claim 1, wherein said sample chamber is additionally provided with means therein for closing said inlet after rupture of said frangible diaphragm.

3. A device for obtaining drilling mud samples within a well bore comprising a container having a sample chamber, an inlet to said chamber communicating with the well bore, means normally closing said inlet comprising an electrically non-conductive frangible diaphragm adapted to be ruptured by a predetermined hydrostatic pressure of drilling mud within said well bore to admit drilling mud to said chamber, a valve controlled by a predetermined liquid level within said chamber for closing said inlet after drilling mud has been admitted into said chamber, said diaphragm being part of an electrical circuit including a resistance measuring device at the surface of the well whereby rupture of said diaphragm is indicated at the surface, and means at the surface of the well to indicate the depth at which said rupture occurs.

4. A device for obtaining drilling mud samples within a well bore comprising a container having a sample chamber, an inlet to said chamber communicating with the well bore, means normally closing said inlet comprising a frangible metal diaphragm adapted to be ruptured by a predetermined hydrostatic pressure of drilling mud within said well bore to admit drilling mud to said chamber, a valve controlled by a predetermined liquid level within said chamber for closing said inlet after drilling mud has been admitted thereto, said diaphragm being part of an electrical circuit including a resistance measuring device at the surface of the well whereby rupture of said diaphragm is indicated at the surface, and means at the surface of the well to indicate the depth at which said rupture occurs.

5. A device for obtaining drilling mud samples within a well bore comprising a cylindrical container having a sample chamber, an inlet to said chamber communicating with the well bore and adjacent the top of said chamber, a valve seating in that end of the inlet adjacent the sample chamber, a spring tending to close said valve, a releasable pin engaging said valve to hold it normally open, and a float within said chamber connected to said pin to release said pin when the level of liquid within said chamber reaches a predetermined height.

6. A device for obtaining drilling mud samples within a well bore comprising a container having a sample chamber, a normally closed inlet to said chamber, pressure responsive means for opening the inlet and admitting drilling mud to said chamber, means for indicating at the surface of the well the opening of said inlet and the depth at which said opening occurs, said pressure responsive means being part of an electrical circuit including said indicating means and the opening of said pressure responsive means electrically actuates said indicating means, means within said chamber for closing said inlet after drilling mud has been admitted thereto.

References Cited in the file of this patent

UNITED STATES PATENTS

| | | |
|---|---|---|
| 1,981,817 | Weatherly | Nov. 20, 1934 |
| 2,187,947 | Miner | Jan. 16, 1940 |
| 2,249,815 | Ennis | July 22, 1941 |
| 2,378,135 | Evans | June 12, 1945 |
| 2,464,456 | McGillis | Mar. 15, 1949 |
| 2,615,080 | Mathews et al. | Oct. 21, 1952 |
| 2,751,456 | Terhume | June 19, 1956 |

UNITED STATES PATENT OFFICE

CERTIFICATE OF CORRECTION

Patent No. 2,941,405            June 21, 1960

Peter F. Southwick

It is hereby certified that error appears in the printed specification of the above numbered patent requiring correction and that the said Letters Patent should read as corrected below.

Column 2, line 34, for "packing" read -- Packing --; column 3, line 45, for "parth" read -- path --; column 6, line 4, list of References Cited, under UNITED STATES PATENTS, for "2,187,947" read -- 2,187,047 --.

Signed and sealed this 13th day of December 1960.

(SEAL)

Attest:

KARL H. AXLINE
Attesting Officer

ROBERT C. WATSON
Commissioner of Patents